United States Patent [19]
Gonzalez

[11] Patent Number: 5,236,229
[45] Date of Patent: Aug. 17, 1993

[54] FLANGE ASSEMBLY WITH RETENTION MEANS

[75] Inventor: Teodoro J. Gonzalez, Canyon Country, Calif.

[73] Assignee: Emhart Inc., Newark, Del.

[21] Appl. No.: 751,049

[22] Filed: Aug. 28, 1991

[51] Int. Cl.[5] ............................................. F16L 5/00
[52] U.S. Cl. ...................................... 285/46; 285/64; 285/349; 285/379; 285/910; 137/359
[58] Field of Search ..................... 285/46, 64, 42, 349, 285/910, 379; 137/359

[56] References Cited

U.S. PATENT DOCUMENTS

| | | |
|---|---|---|
| 1,080,520 | 12/1913 | Schuermann . |
| 1,212,797 | 1/1917 | Mueller et al. . |
| 1,502,154 | 7/1924 | Mueller et al. . |
| 1,688,629 | 10/1928 | Mueller et al. ........................ 137/359 |
| 1,921,709 | 2/1932 | Diamond ........................... 285/46 X |
| 2,507,467 | 5/1945 | Fredrickson ...................... 137/359 |
| 3,544,119 | 12/1970 | Glover ............................ 285/379 X |
| 3,823,964 | 7/1974 | Politz . |
| 3,924,881 | 12/1975 | O'Connor ...................... 285/379 X |
| 4,385,777 | 5/1983 | Logsdon . |
| 4,513,769 | 4/1985 | Purcell ................................ 137/359 |
| 4,562,964 | 1/1986 | Stecher ............................ 285/46 X |

FOREIGN PATENT DOCUMENTS

| | | | |
|---|---|---|---|
| 3533000 | 3/1987 | Fed. Rep. of Germany ...... | 285/379 |
| 1217120 | 12/1970 | United Kingdom ................ | 285/379 |

*Primary Examiner*—Eric K. Nicholson
*Assistant Examiner*—Heather Chun
*Attorney, Agent, or Firm*—J. Bruce Hoofnagle

[57] ABSTRACT

A flange assembly (24) includes a cover (26), a base (28) and a compliant gasket (30) all of which are of circular configuration with a central opening. Gasket (30) is assembled within a nest formed by tapered surface (52) and rim (50) of base (28). Cover (26) is assembled with base (28) by the snap fit of inwardly turned edge (38) of the cover into annular groove (56) of the base. In this position, an inwardly turned lip (34) of cover (26) engages a ledge (70) of gasket (28) to retain the gasket within the nest. A section (78) of gasket (28) extends into a central opening of flange assembly (24) and includes a tapered inner side wall (62) which frictionally engages a conduit (20) of a faucet as the flange assembly is slid onto the conduit. Conduit (20) compresses section (78) of gasket (28) which includes side wall (62) into the nest where the forces of the compressed gasket retain flange assembly (24) with the conduit.

9 Claims, 4 Drawing Sheets

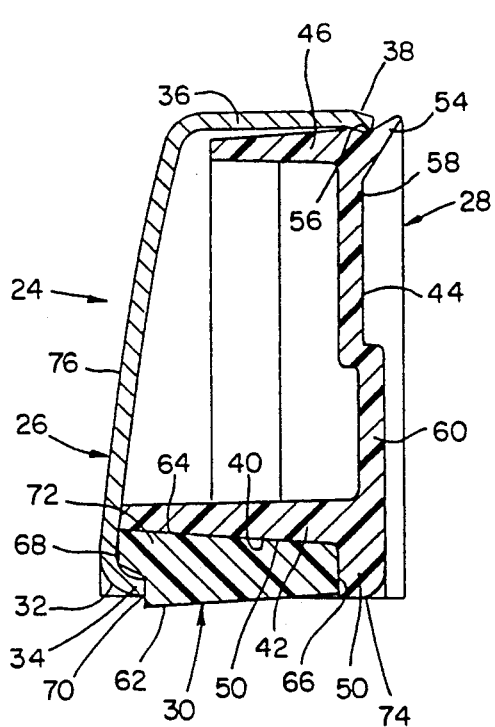
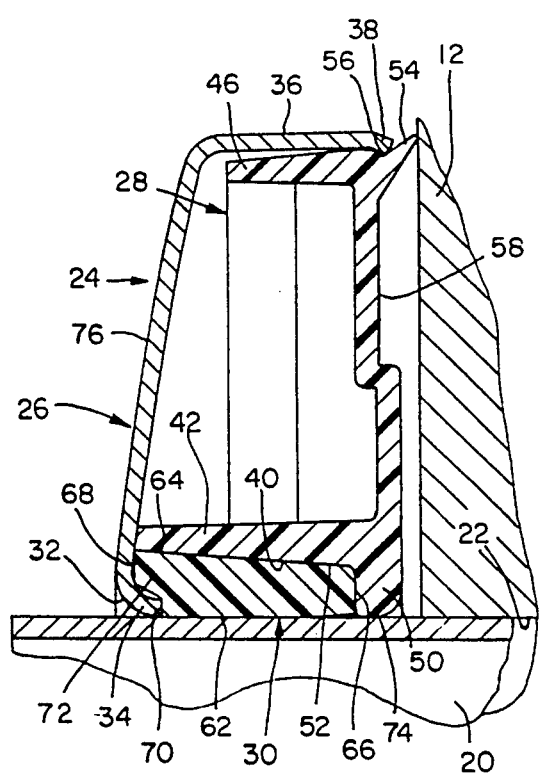
FIG. 2
FIG. 3

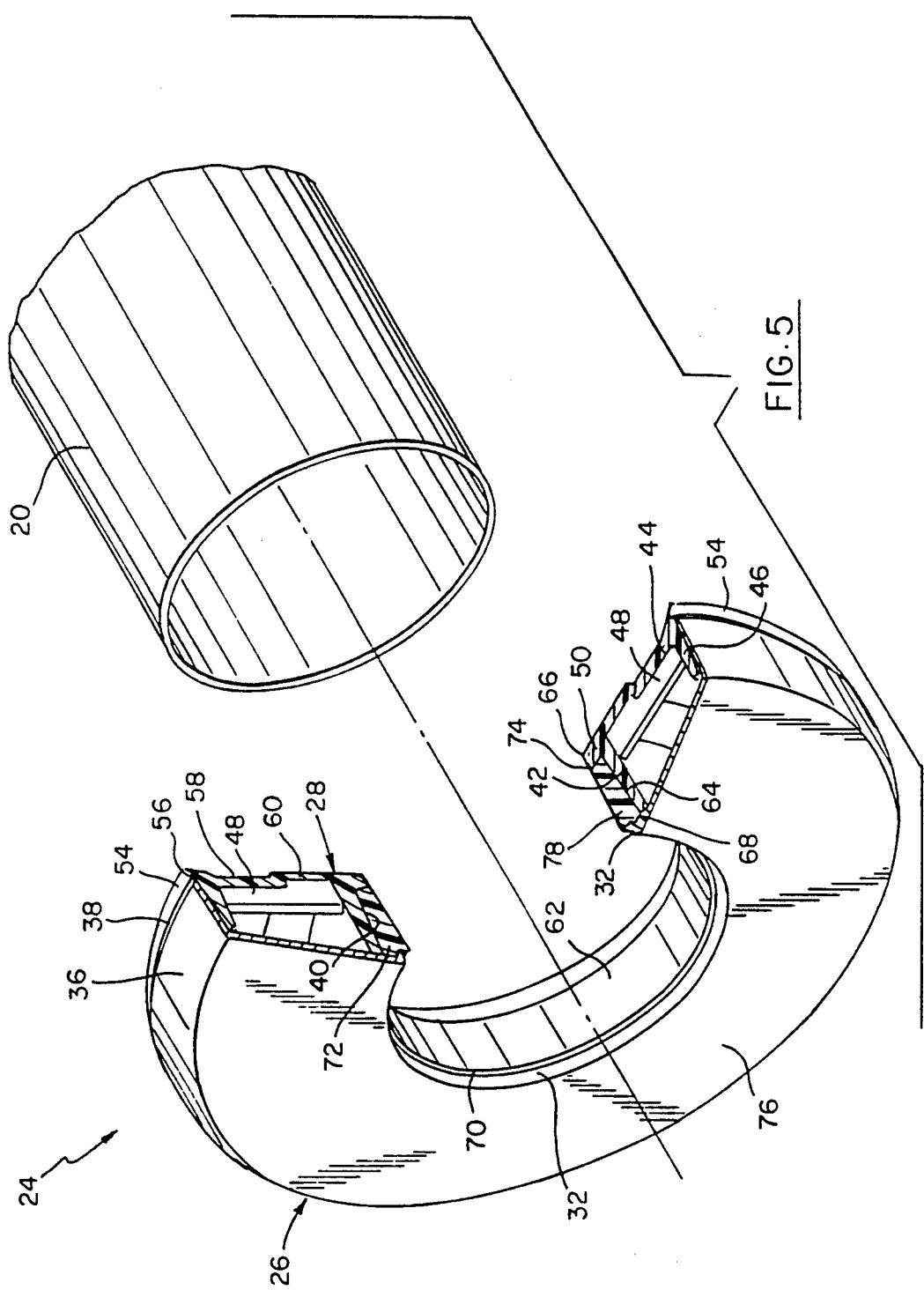

FLANGE ASSEMBLY WITH RETENTION MEANS

BACKGROUND OF THE INVENTION

This invention relates to a flange assembly with means for retaining the assembly with a mounting element. This invention particularly relates to a flange assembly which slides onto and is retained with a conduit of a faucet to prevent water from leaking through conduit passages formed in an associated wall.

Wall flanges are typically used to cover the openings or passages in a wall through which water conduits of a shower are located. Such flanges then prevent water from leaking from the shower side of the wall, through the passages and to the other side of the wall, all of which could cause deterioration of the integrity of the wall and corrosion of other adjacent facilities.

To facilitate easy installation, some wall flanges are adjustable to compensate for variations in the wall. Also, some popular designs use setscrews to fasten the flange on the faucet, which may also be referred to as a conduit, after the flange has been adjusted to the wall. Still other designs are used which allow for the threading of the flange against the wall until fully secured.

Recent designs have used friction between the flange and the faucet to obtain the wall adjustment. In one example of the friction design, a sheet metal flange is formed toward the inside center of the flange with finger-like surfaces that contact and frictionally cling to the faucet body. A variation of this design incorporates a rubber "O" ring between the flange and the faucet to develop the required friction. Both of the friction designs require pressure created by the contacting surfaces of the flange and the faucet to secure the flange in place.

The disadvantages encountered with the foregoing examples are numerous and varied. For example, when setscrews are used to secure the flange, surfaces of the faucet are damaged and defaced by scratches made by the setscrews. Also, flanges scratch the faucets when the hard surfaces thereof come into contact during assembly. In a bathroom facility, the surfaces of a faucet which are typically exposed to view are treated for aesthetic purposes and normally will be finished with a decorative coating. Consequently, any visible scratches to the treated surfaces of the faucets will detract from the intended pleasing appearance thereof.

In addition to the above-noted damaging effects, the appearance of a faucet may also be degraded when setscrews or other fastening devices or features used in securing the flange are exposed to view. This includes holes or protrusions that are required for assembly.

While the use of sealing putty around the wall openings might seem appropriate, the majority of the currently available flanges do not provide surfaces to facilitate the application of putty. Apparently, the use of putty violates the intended purpose of the flange to insulate and shield the openings of the wall from the water on the shower side.

Further, adjustable flanges that include "O" rings to obtain the adjustment are normally expensive and difficult to manufacture. This is particularly so because most flanges of this type are composed of solid brass and are formed with an internal groove to fit the "O" ring.

Thus, there is a need for a flange which will overcome the above noted deficiencies while optimizing the function of the flange, reducing manufacturing costs, improving the flange quality and, above all, providing a more reliable adjustment method.

SUMMARY OF THE INVENTION

It is an object of this invention to provide a flange assembly which can be assembled with a mounting element with relative ease while requiring considerable force to remove the flange assembly from the mounting element.

Another object of this invention is to provide a flange assembly which slides relatively easily onto a conduit of a faucet and seats against an associated wall panel to preclude leakage of water into a conduit passage formed in the wall panel.

With these and other objects in mind, this invention contemplates a flange assembly for assembly with a mounting element and includes a housing having an opening for location on the mounting element upon assembly of the flange assembly with the mounting element. The housing is formed with a nest which is in open communication with the opening of the housing. A compliant element is located within the nest and has a section thereof which normally extends into the opening of the housing and which is positioned to be compressed into the nest upon assembly of the flange assembly with the mounting element.

This invention further contemplates a flange assembly for assembly with a mounting element and includes a base, a gasket and a cover. The base is formed with a nest in which the gasket is situated for eventual engagement with the mounting element when the flange assembly is assembled with the mounting element. The cover is assembled with the base and is in a position to retain the gasket with the nest. Means are provided for allowing assembly of the flange assembly with the mounting element upon the application of a force of a first magnitude and for requiring a force of a second magnitude greater than the first magnitude to disassemble the flange assembly from the mounting element.

BRIEF DESCRIPTION OF THE DRAWINGS

In the accompanying drawings:

FIG. 2 is a partial sectional view showing a flange assembly in accordance with certain principles of the invention;

FIG. 3 is a partial sectional view showing the flange assembly of FIG. 2 assembled with a faucet or conduit in accordance with certain principles of the invention;

FIG. 5 is a perspective view with parts removed showing the assembled cover, base and gasket of the flange assembly in accordance with certain principles of the invention.

DETAILED DESCRIPTION OF THE PREFERRED EMBODIMENT

Figure 1:
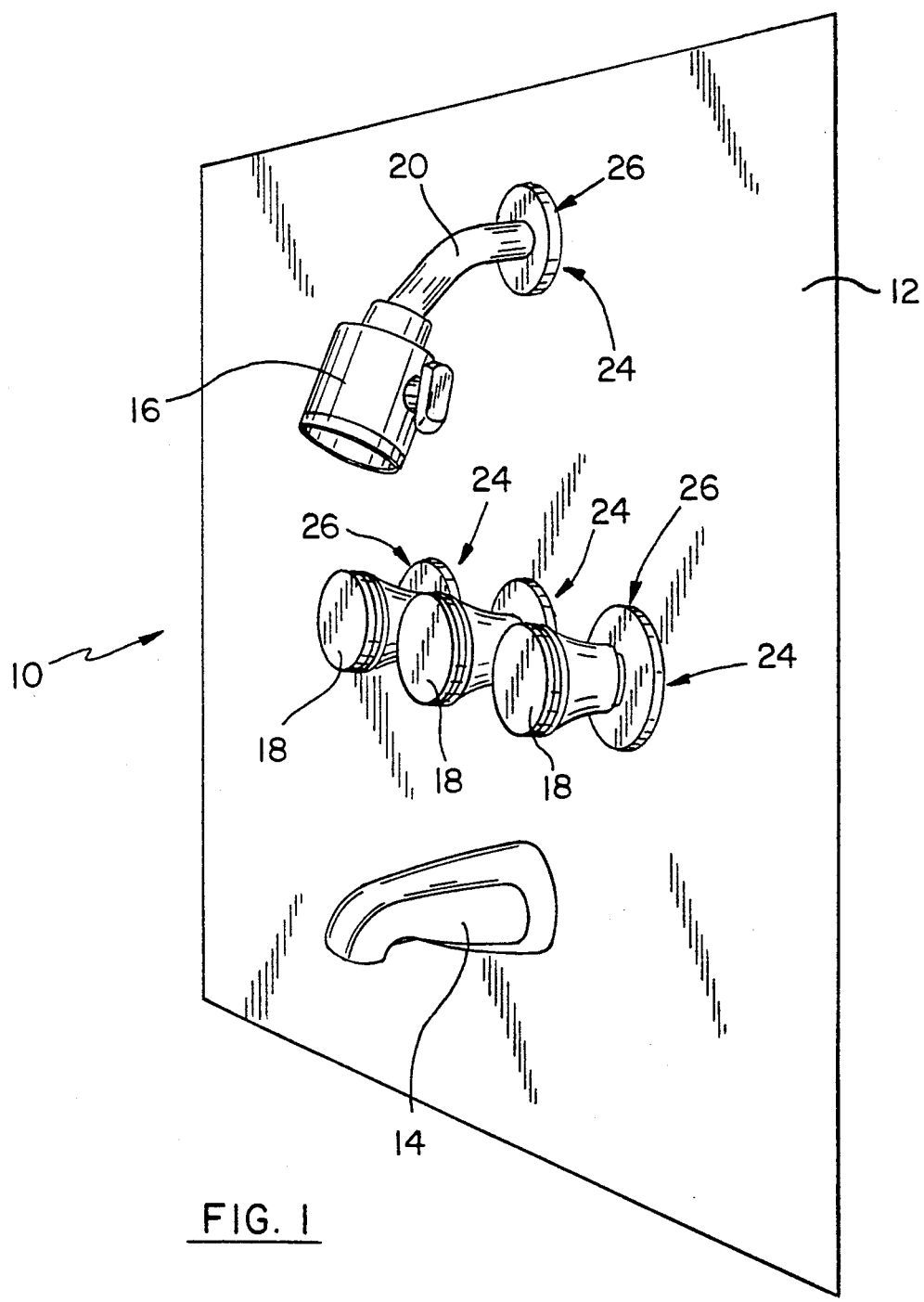
FIG. 1 is a perspective view showing a typical wall mount bathroom faucet, shower and flange assembly.

Referring to FIG. 1, a bathroom faucet and water dispensing assembly 10 is mounted on a wall panel 12. Assembly 10 includes a spout 14, a showerhead 16, and control knobs 18. Showerhead 16 is attached to a water-delivery faucet or conduit 20 which extends through an opening or passageway 22 (FIG. 3) formed in wall panel 12. Knobs 18 are also mounted on pipes (not shown) which extend through other passages (not shown) formed through wall panel 12.

A flange assembly 24 is positioned over conduit 20 and is flush against wall panel 12 and prevents water from leaking from the visible side of the wall panel as illustrated in FIG. 1, through passage 22 and into the area on the opposite or hidden side of the wall panel. Flange assemblies 24 are similarly mounted against wall panel 12 and behind knobs 18 for the same purpose.

Figure 4:
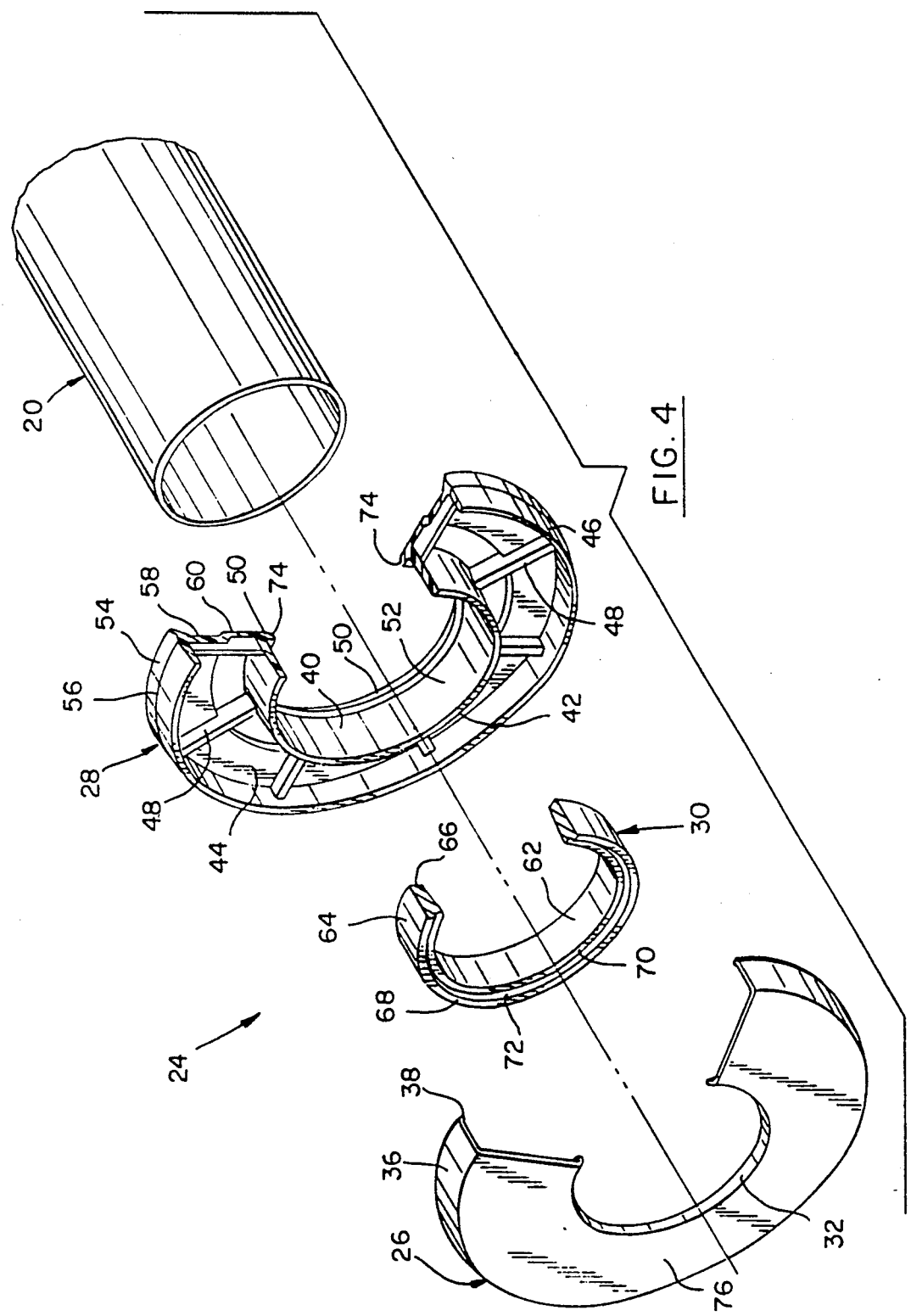
FIG. 4 is an exploded perspective view showing a cover, base and gasket which form the flange assembly in accordance with certain principles of the invention.

Referring to FIGS. 2, 4 and 5, flange assembly 24 includes a cover 26, a base 28 and a gasket 30. Cover 26 is typically made from sheet brass and may be coated for protective and decorative purposes. Base 28 is composed of a polymer plastic while gasket 30 is composed of an elastomer material with some degree of compliability.

Cover 26 is formed in a circular dish-like configuration having a central opening 32 with an inwardly turned lip 34. Cover 26 is also formed with a side wall 36 which is formed with a slightly inwardly turned edge 38.

Base 28 is formed in a circular configuration with a central opening 40. Central opening 40 is formed by an inner circular band or wall 42 which is linked through a solid web section 44 to an outer circular band or wall 46. Radially arranged ribs 48 extend between and are integrally formed with walls 42 and 46 and web section 44 to provide strengthening support for base 28. A radially inward rim 50 is formed at one end of opening 40 while an inner surface 52 of the opening is tapered radially outwardly from the rim to the opposite end of the opening. Outer wall 46 is formed with an outwardly flared edge 54 at one end thereof and with an annular groove 56 at the inward base of the flared edge.

Wall 46 extends from groove 56 to the opposite end of the wall and is slightly tapered in a radially inwardly manner from the groove to the opposite end. It is noted that groove 56 extends radially inwardly from the portions of wall 46 which are adjacent the groove. Web 44 is located axially inward of flared edge 54 to form a dish-like depression 58 with a projection 60 extending slightly from the base thereof as illustrated particularly in FIGS. 2 and 3.

Gasket 30 is formed in a band-like circular configuration having a wedge-shaped cross section as illustrated in FIG. 2. The wedge-shaped cross section is created by a tapered inner side wall 62 and a tapered outer side wall 64 which diverge from a flat trans-axis end 66 toward a ledge end 68. A ledge 70, which is generally parallel with flat end 66 is formed in a cutout in inner side wall 62 at the ledge end 68 thereof which results in the formation of an outer rim 72 at the ledge end.

In assembly, gasket 30 is inserted into opening 40 of base 28 until flat end 66 abuts rim 50. It is noted that the taper of outer side wall 64 of gasket 30 compliments the taper of inner surface 52 of base 28 such that the gasket fits snugly within opening 40 of the base. In this manner, opening 40, which is formed by rim 50 and inner surface 52, forms a nest for receipt of gasket 28. Thereafter, cover 26 is positioned over a portion of base 28 which includes inner circular wall 42 and a portion of outer circular wall 46. As cover 26 is assembled with base 28, inwardly turned edge 38 of the cover snaps into annular groove 56 of the base to retain the cover with the base. Also, inwardly turned lip 34 of cover 26 abuts ledge 70 of gasket 30 and extends around the inward side of outer rim 72 of the gasket. The location of lip 34 conceals gasket 30 when flange assembly 24 is assembled on conduit 20 to provide a finished and decorative appearance. Also, lip 34 serves to retain gasket 30 in its position of assembly within the nest of base 28 as described above. In this manner, cover 26 and base 28 combine to form a housing for gasket 30.

As illustrated in FIG. 5, rim 50 is located on a first side of flange assembly 24 and includes a radially-inward circular surface 74 which forms a conduit-entry end of the central opening of the flange assembly. An outer surface 76 of cover 26 forms a second side of flange assembly 24.

As illustrated in FIG. 2, the tapered inner wall 62 of gasket 30 tapers radially inwardly from the first side to the second side of flange assembly 24 which is the direction of inserting conduit 20 into the opening of flange assembly 24. As further shown in FIG. 2, a lower section 78 of gasket 30 including side wall 62 extends radially inwardly of the central opening of flange assembly 24 and beyond cover 26 and base 28 so that the extended section of the gasket is in position to engage conduit 20 when flange assembly 24 is assembled with the conduit.

Referring to FIG. 5, flange assembly 24, with the assembled cover 26, base 28 and gasket 30, is positioned in axial alignment with conduit 20 in preparation for assembling the flange assembly with the conduit. As noted above, rim 50 of base 28 is formed with the radially-inward circular surface 74 which defines the conduit-entry opening of flange assembly 24. The diameter of the conduit-entry end opening formed by circular surface 74 is slightly larger than the outer diameter of conduit 20 such that the circular surface will slide over the outer surface of the conduit without marring the outer surface. In addition, surface 74 is a part of base 28 which is composed of a plastic material, as noted above, which will not mar the conduit surface.

As flange assembly 24 is moved further onto conduit 20, section 78 of the inner surface 62 of gasket 30 which extends radially inwardly from the plane of circular surface 74 begins to frictionally engage the conduit. Since inner side wall 62 is tapered radially inwardly and toward surface 76 of cover 26, flange assembly 24 slides onto conduit 20 with relative ease requiring a low-level force as the conduit moves relatively in the direction of the taper of side wall 62. Gradually, successive portions of section 78 of gasket 30 which include side wall 62 are compressed into the nest formed by opening 40 and into a position as illustrated in FIG. 3 whereby the formerly tapered side wall 62 is now generally parallel to the outer surface of conduit 20. Even though flange assembly 24 is now fully positioned on conduit 20, the assembly must be slid further on the conduit until flared edge 54 of base 28 engages and seats on wall panel 12 as shown in FIG. 3.

While the direction of the taper of side wall 62 was such to require a comparatively small force to assemble flange assembly 24 onto conduit 20, the location of forces of the compressed material of gasket 30 as applied against adjacent portions of the conduit makes it extremely difficult to move the assembly in the opposite direction on the conduit. Thus, a relatively lower first force is required to position flange assembly 24 onto conduit 20. However, due to the compressing forces of gasket 30 being applied to conduit 20 in the area where the assembled gasket was formerly tapered at side wall 62, a relatively higher second force, greater than the first force, is required to move flange assembly 24 in a reverse direction on the conduit. In this manner, once the flange assembly 24 has been assembled against wall panel 12 as illustrated in FIG. 3, the assembly will be retained in this position by virtue of the location and force from the compressed material of gasket 30. This arrangement relieves stresses that would normally cause damage to the materials over a period of time.

In the manner described above, then, flange assembly 24 provides a geometry of parts which function in such a way that the assembly does not encounter deficiencies encountered by prior devices.

As described above, gasket 30 is formed with a wedge shape resulting in an internal taper and an external taper. In this configuration, the narrowest portion of the wedge shape of gasket 30 is located adjacent base rim 50, as illustrated in FIG. 2, while the widest portion is located adjacent cover lip 34. Thus, gasket 30 stretches away from the mating surface of conduit 20 during assembly of flange assembly 24 and compresses against the surface when being disassembled. The friction between the contacting surfaces provides the resulting effect as described above.

Additionally, due to the compliability of gasket 30, the gasket does not scratch or mar the treated surface of conduit 20 and also maintains a distance between the conduit and the other components of flange assembly 24 to prevent hard surfaces thereof from coming in contact with the conduit.

Unlike current flange designs that use "O" rings, the contact area between gasket 30 and conduit 20 extends for nearly the full length of flange assembly 24. This becomes important over an extended period when gasket 30 becomes fully relaxed to provide a maximum adhesion or grip to conduit 20. This results in an almost-permanent union but still permits flange assembly 24 to be removed from conduit 20 as described above.

The gripping effect of gasket 30 can be set to any desired force by selecting the properties of the material of the gasket. Further, the structural design of flange assembly 24 allows the material of cover 26 to be of minimum thickness and still provide the strength of solid brass counterparts. This is due, in part, to the strategically located ribs 48 of base 28. The result is lower cost without loss of strength.

When cover 26, base 28 and gasket 30 are assembled, seals are formed at the juncture areas of contact amongst the cover, base and gasket. This action provides a flange assembly 24 which is impermeable to water and thereby precludes water from entering the internal chambers thereof. Existing designs have no provisions to prevent interior water leakage which results in premature corrosion of components and hard water staining.

Base 28 is formed with depression 58 which faces wall panel 12 when flange assembly 24 is assembled with conduit 20 to the position illustrated in FIG. 3. Depression 58 is designed to accept a sealing compound such as, for example, sealing putty that will prevent water from entering between flange assembly 24 and wall panel 12 in the event that water can leak past outwardly flared edge 54 of base 28. The sealing putty is concealed within depression 58 by virtue of the manner in which outwardly flared edge 54 of base 28 seats against wall panel 12.

In summary, flange assembly 24 provides for easy assembly with conduit 20 while precluding easy removal. In this manner, flange assembly 24 remains in place on conduit 20 and against wall panel 12 to effectively prevent water leakage through wall panel passageway 22. Flange assembly 24 is lightweight, economical and can be assembled with conduit 20 without damaging or marring the conduit.

The above-described embodiment, of course, is not to be construed as limiting the breadth of the present invention. Modifications, and other alternative constructions, will be apparent which are within the spirit and scope of the invention as defined in the appended claims.

What is claimed is:

1. A flange assembly for assembly with a mounting element, which comprises:
   a housing having an opening for location on the mounting element upon assembly of the flange assembly with the mounting element;
   the housing formed with an enclosure having a nest which is in open communication with the opening of the housing;
   a compliant gasket located and captured within the nest and having a section thereof which normally extends into the opening of the housing and which is positioned to be compressed into the nest upon assembly of the flange assembly with the mounting element;
   the section of the gasket having varying proportions which extend into the opening including a tapered wall which faces inwardly of the opening;
   the housing is formed with a first side which is inclusive of an end of the opening into which the mounting element is first inserted and a second side opposite the first side;
   the section of the gasket extending in varying proportions from the nest and into the opening with the smallest proportion being closest to the first side of the flange assembly;
   the section of the gasket with varying proportions which includes the tapered wall and which faces inwardly of the opening being tapered in a direction from the first side of the flange assembly toward the second side thereof inwardly of the opening;
   the next is formed with a tapered surface opposite the opening of the flange assembly and tapering away from the opening in a direction from the first side to the second side of the flange assembly; and
   the gasket is wedge-shaped by formation of the tapered wall facing into the opening on one side of the gasket and a second tapered wall on the opposite side of the gasket which is in complimentary assembly with the tapered surface of the nest.

2. A flange assembly for assembly with a mounting element, which comprises:
   a housing having an opening for location on the mounting element upon assembly of the flange assembly with the mounting element;
   the housing formed with an enclosure having a nest which is in open communication with the opening of the housing;
   a compliant gasket located and captured within the nest and having a section thereof which normally extends into the opening of the housing and which is positioned to be compressed into the nest upon assembly of the flange assembly with the mounting element;
   the section of the gasket having varying proportions which extend into the opening including a tapered wall which faces inwardly of the opening;
   the housing is formed with a first side which is inclusive of an end of the opening into which the mounting element is first inserted and a second side opposite the first side;

the section of the gasket extending in varying proportions from the nest and into the opening with the smallest proportion being closest to the first side of the flange assembly; and means for allowing the varying proportions of the section of the gasket of the flange assembly to be assembled with the mounting element upon the application of a force of a first magnitude and resists disassembly thereof from the mounting element until application of a force of a second magnitude greater than the first magnitude.

3. A flange assembly for assembly with a conduit, which comprises:

a base having a nest formed therein;
a gasket composed of a pliable material situated in the nest;
a cover assembled with the base and in position to retain the gasket within the next;
an opening formed in the flange assembly for facilitating positioning of the flange assembly onto the conduit;
the opening extending from a first side of the flange assembly toward a second side thereof and having a conduit-entry end at the first side into which the conduit is initially assembled with the flange assembly;
a section of the gasket extending in varying proportions from the next and into the opening with the smallest proportion being closest to the conduit-entry end and the section being in position for engagement with the conduit upon assembly of the flange assembly with the conduit; and
the nest is formed with a tapered surface opposite the opening of the flange assembly and tapering away from the opening in a direction from the first side of the flange assembly to the second side thereof.

4. The flange assembly as set forth in claim 3 wherein the gasket is wedge-shaped by the formation of a first tapered wall on a first side thereof and a second tapered wall on a second side thereof opposite the first side thereof with a smaller end of the wedge-shaped gasket being located closest to the first side of the flange assembly and with the first tapered wall being in complimentary assembly with tapered surface of the nest.

5. The flange assembly as set forth in claim 4 wherein a portion of the gasket including at least a portion of the second tapered surface forms the section of the gasket extending into the opening.

6. A flange assembly for assembly with a conduit, which comprises:

a base having a nest formed therein;
a gasket composed of a pliable material situated in the nest;
a cover assembled with the base and in position to retain the gasket within the next;
an opening formed in the flange assembly for facilitating positioning of the flange assembly onto the conduit;
the opening extending from a first side of the flange assembly toward a second side thereof and having a conduit-entry end at the first side into which the conduit is initially assembled with the flange assembly;
a section of the gasket extending in varying proportions from the nest and into the opening with the smallest proportion being closest to the conduit-entry end and the section being in position for engagement with the conduit upon assembly of the flange assembly with the conduit; and
the base formed with an outwardly flared edge on the first side of the flange assembly for engagement with a wall panel upon assembly of the flange assembly with the conduit.

7. A flange assembly with a conduit, which comprises:

a base having a nest formed therein;
a gasket composed of a pliable material situated in the nest;
a cover assembled with the base and in position to retain the gasket within the nest;
an opening formed in the flange assembly for facilitating positioning of the flange assembly into the conduit;
the opening extending from a first side of the flange assembly toward a second side thereof and having a conduit-entry end at the first side into which the conduit is initially assembled with the flange assembly;
a section of the gasket extending in varying proportions from the nest and into the opening with the smallest proportion being closest to the conduit-entry end and the section being in position for engagement with the conduit upon assembly of the flange assembly with the conduit; and
a depression formed in the outer side of the base at the first side of the flange assembly for receipt of a sealing compound therein to form a seal between the flange assembly and a wall panel when the flange assembly is assembled with the conduit.

8. A flange assembly for assembly with a conduit, which comprises:

a base having a nest formed therein;
a gasket composed of a pliable material situated in the nest;
a cover assembled with the base and in position to retain the gasket within the next;
an opening formed in the flange assembly for facilitating positioning of the flange assembly onto the conduit;
the opening extending from a first side of the flange assembly toward a second side thereof and having a conduit-entry end at the first side into which the conduit is initially assembled with the flange assembly;
a section of the gasket extending in varying proportions from the nest and into the opening with the smallest proportion being closest to the conduit-entry end and the section being in position for engagement with the conduit upon assembly of the flange assembly with the conduit; and
the base is formed by an inner circular band having a central opening and an outer circular band joined together by a web and radially spaced ribs.

9. A flange assembly for assembly with a mounting element, which comprises:

a housing having an opening which is located therethrough for positioning on the mounting element upon assembly of the flange assembly with the mounting element;
the opening having a first end into which a forward portion of the mounting element is first inserted and a second end from which the forward portion extends when the flange assembly is assembled with the mounting element;

the housing formed with an enclosure having a nest which is in open communication with the opening of the housing;

the nest formed with a wall generally opposite the opening of the housing;

the wall being formed with a first end and a second end spaced therefrom;

the first end of the wall being located toward the first end of the housing and the second end of the wall being located toward the second end of the housing;

the wall at the first end being closer to the opening than the second end thereof so that the wall forms a tapered portion thereof between the first and second ends;

a wedge-shaped compliant gasket having a first tapered surface on a first side of the gasket and a second tapered surface on a second side of the gasket opposite the first side;

the wedge-shaped gasket having a narrow end and a wide end opposite the narrow end where the first and second tapered surfaces are closer to each other at the narrow end than at the wide end;

the gasket being assembled partially within the nest so that the first tapered surface of the gasket is in facing assembly with the tapered portion of the wall and so that a portion of the gasket inclusive of a portion of the second tapered surface which is closest to the wide end extends into the opening as it tapers toward the second end of the opening; and the narrow end of the wedge-shaped gasket being located within the nest and adjacent the first end of the opening and the wide end of the gasket being located adjacent the second end of the opening.

* * * * *